Jan. 21, 1964  P. EALET  3,118,426
ANIMAL-CONTROLLED WATERING TROUGH
Filed Oct. 19, 1961  2 Sheets-Sheet 1
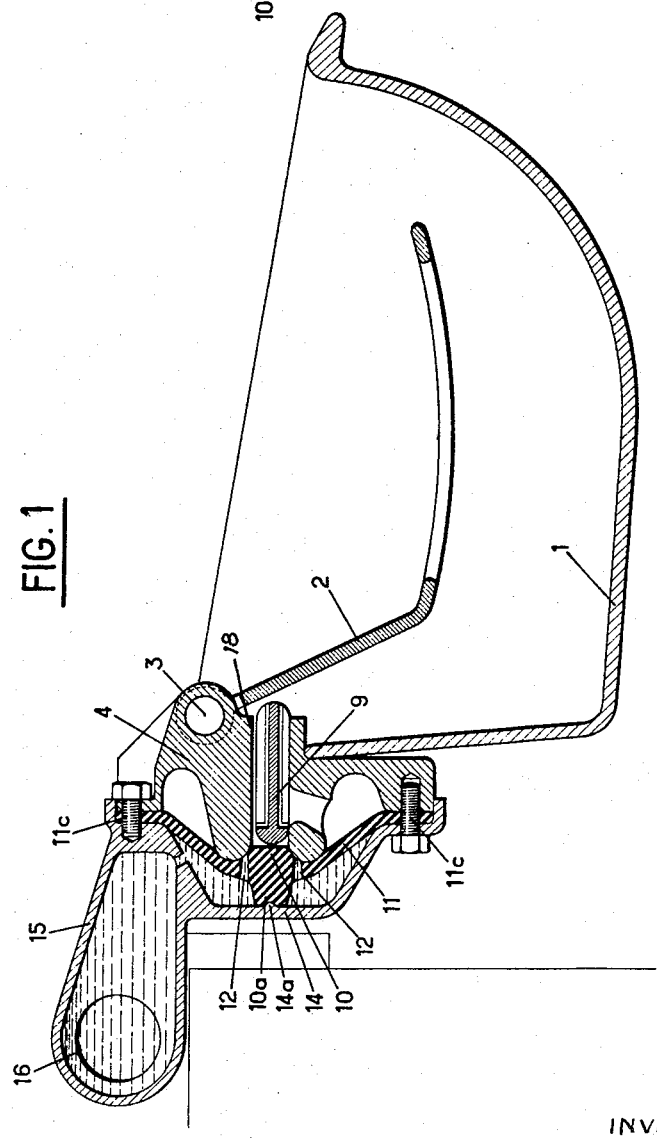
INVENTOR
Pierre Ealet
By Holcomb,
ATTORNEYS

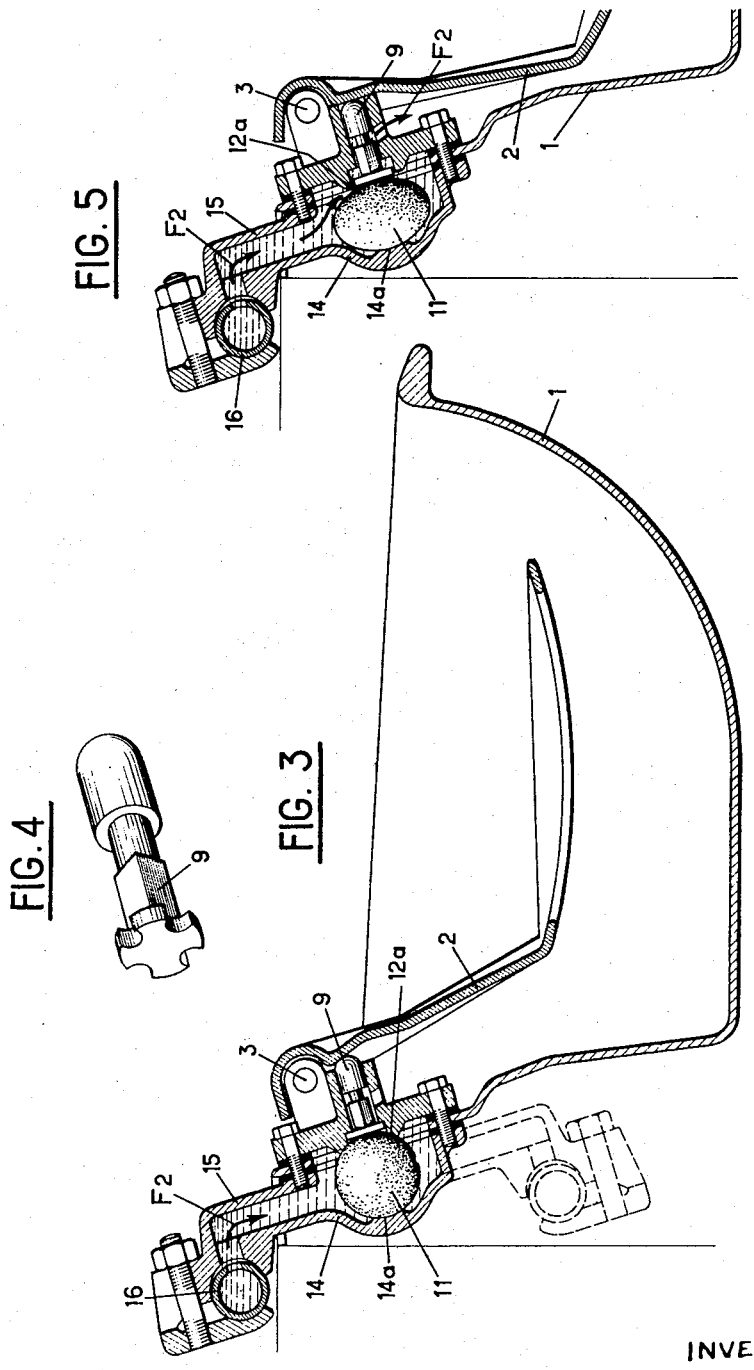

United States Patent Office 3,118,426
Patented Jan. 21, 1964

3,118,426
ANIMAL-CONTROLLED WATERING TROUGH
Pierre Ealet, Charleville, Ardennes, France, assignor to Etablissement Gustin Fils, Deville, Ardennes, France, a corporation of France
Filed Oct. 19, 1961, Ser. No. 146,258
Claims priority, application France Jan. 9, 1961
1 Claim. (Cl. 119—75)

Individual watering troughs of the type comprising a single bowl are well known, and it is conventional to design such troughs so that the bowl is automatically filled with water by the animal itself which, by instinct, presses with its muzzle on a float board. Such troughs, inter alia, comprise one or more springs and valves which tend to get out of order.

In some of these troughs the bowl is supplied with water by means of an elastic membrane controlled by a pressure member which cooperates with said pivoting float board. This membrance serves two purposes: (1) It normally blocks (by means of a projection serving as a valve member) the inlet through which water is supplied to the bowl. (2) It permits water to flow into the bowl when the animal presses its muzzle down on the float board. In installations which are supplied with water under normal pressure, the membrane which has just been described functions perfectly. However, in installations supplied from a low pressure source, the said membrance may not be pressed against its seat with sufficient force to prevent the leakage of water. This water accumulates in the bowl and stagnates there for an indefinite length of time, which is quite undesirable.

It is the object of the present invention to provide a membrane type watering trough in which these disadvantages have been eliminated.

Such a watering trough is characterized by the fact that its membrane carries, on the one of its surfaces opposite to that on which it carries the projection which serves as a valve member, a bulge having an elasticity which enables it, when squeezed, to store up as a consequence of its compression against an abutment provided for that purpose, a force capable, even if the water pressure is very low, of holding the valve member tightly against its seat, without requiring an excessive pressure by the animal against the float board in order to release it.

In one embodiment, the said membrane is replaced by an elastic body which is of spherical, ovoid, or like shape, one side of which is pressed against the seat of the inlet to serve as a valve member, while the diametrically opposite side thereof serves the purpose of the elastic bulge hereinbefore described.

In order that the object of the invention may be better understood, two embodiments of the invention will now be described, in connection with the accompanying drawings, purely by way of illustration and example, without limiting the scope of the invention to the details thereof.

In the drawings:

FIG. 1 is a cross-sectional view showing an automatic watering trough according to one of these embodiments;

FIG. 2 is a detail view showing the membrane-valve member of FIG. 1;

FIG. 3 shows a watering trough comprising a second embodiment of the valve, which is in closed position;

FIG. 4 is a detail view on an enlarged scale showing the pressure member which cooperates with the valve shown in FIG. 3; and FIG. 5 is a partial view showing the watering trough of FIG. 3, with its valve member compressed by the pressure member, thus permitting water to flow into the bowl.

Referring now to the drawings, it will be seen from FIGS. 1 and 2 that the bowl of the watering trough has been assigned reference numeral 1, and reference numeral 2 has been assigned to the float board which is mounted to pivot at 3 on a distributor box 4, so that it may act through a pressure member 9 on the central part 10 of a membrane 11, which serves as a valve member, is pierced by the holes 12, is held at its edges by means of bolts 11c, for example, and is stretched between the box 4 and the hollow body 15, to which the water inlet 16 is connected.

According to the present invention, the membrane 11 is provided on the surface opposite the one carrying the valve member 10, with a resilient bulge 10a which is compressed against the wall 14 when the valve is opened. A protuberance 14a on the wall 14 then engages in a recess 10b (FIG. 2) in the bulge 10a, thus centering the valve member 10 on its seat.

This watering trough operates as follows:

The animal, which pushes on the float board 2, turns it about its axis 3 and lowers it in the bowl 1. This movement results in the displacement of the pressure member 9 within the tube 18, which forces the protuberance 10 of the membrane 11 away from its seat. Water then escapes through the calibrated orifices 12 and, passing between the vanes of the pressure member 9, flows into the bowl 1.

When the animal ceases to press on the float board, the membrane 11, as a consequence of its own resilience, returns the valve member 10 to its seat, thus stopping the flow of water.

It should be noted that, even in the case of a very low water pressure, the valve 10 is kept tightly closed by the pressure exerted on it by the energy stored in the bulge 10a during its compression against the boss 14a, when the valve is opened.

The embodiment shown on FIGURES 3, 4 and 5 is similar to the one which has just been described, except for the valve member 10. This valve member is replaced by a sphere 11 of elastic material, which is given a predetermined compression when it is inserted, which compression is compatible with the pressure likely to be exerted by the muzzle of the animal on the float board. The sphere is inserted between the seat of the water inlet and a concavity 14a, formed in the inner wall of the back 14 of the hollow body 15.

The water flows, as indicated by the arrows F2 of FIG. 5, through the seat 12a when the pressure member 9 is moved by the float board 2 sufficiently to compress the sphere 11 and disengage it from its seat 12a.

When the animal ceases to press on the float board 2, the pressure member 9 returns to its original position, permitting the sphere 11 to resume its original shape as shown in FIG. 3, and tightly close off the seat 12a, even in the absence of water pressure, thus accomplishing the object of the invention.

What is claimed is:

An automatic watering trough comprising a bowl, a tube leading into said bowl and terminating at an end away from said bowl in a valve seat, abutment means in alignment with and spaced from said seat, an integral valve member of resilient compressable material positioned between and normally in contact with both said abutment and valve seat, means for retaining said valve member in alignment with said seat, pressure means slidable within said tube for forcing said valve member away from said seat thereby compressing it against said abutment, and pivotally mounted lever means in said bowl positioned to actuate said pressure means when forced downwardly into said bowl.

References Cited in the file of this patent

UNITED STATES PATENTS

| | | |
|---|---|---|
| 49,527 | Jenkins | Aug. 22, 1865 |
| 1,860,888 | Crowley | May 31, 1932 |
| 2,181,900 | Langdon | Dec. 5, 1939 |

FOREIGN PATENTS

| | | |
|---|---|---|
| 225,113 | Switzerland | Apr. 1, 1943 |
| 312,924 | Switzerland | Apr. 30, 1956 |
| 1,237,844 | France | June 27, 1960 |